United States Patent [19]

Kotezawa et al.

[11] 4,086,429
[45] Apr. 25, 1978

[54] SYNCHRONIZING SYSTEM FOR USE IN TELECOMMUNICATION

[75] Inventors: Katsutaka Kotezawa; Toshimi Onodera; Setsuo Hayashi; Fujio Shimanuki, all of Funabashi, Japan

[73] Assignee: Chiba Communications Industries, Inc., Japan

[21] Appl. No.: 702,455

[22] Filed: Jul. 6, 1976

[51] Int. Cl.$^2$ .............................................. H04L 7/00
[52] U.S. Cl. ................................... 178/69.1; 343/178; 325/21
[58] Field of Search .......................... 325/31, 21, 22; 343/175, 176, 178; 178/69.1, 58 R, 58 A

[56] References Cited

U.S. PATENT DOCUMENTS

| | | | |
|---|---|---|---|
| 2,498,635 | 2/1950 | Bailey | 343/178 |
| 2,532,310 | 12/1950 | Homrighous | 343/178 |
| 2,657,304 | 10/1953 | Parks | 325/21 |
| 3,267,427 | 8/1966 | Hoek | 343/176 |
| 3,584,301 | 6/1971 | Tomaszewski | 325/21 |
| 3,896,379 | 7/1975 | Voss et al. | 325/21 |

*Primary Examiner*—Robert L. Griffin
*Assistant Examiner*—Michael A. Masinick
*Attorney, Agent, or Firm*—Emrich, Root, O'Keeffe & Lee

[57] ABSTRACT

A synchronizing circuit for use in time division simultaneous telecommunication for attaining synchronized alternate transmission and reception of aural signal between a calling station and a called station at a predetermined rate of time division. The synchronizing circuit is provided in each of the calling and called stations, and comprises first detecting means for detecting transmission of an aural signal from the called station, second detecting means for detecting transmission of an aural signal from the calling station, and means for energizing the transmitter in the calling station while locking the receiver in the calling station when the first detecting means is not detecting an aural signal transmitted from the called station and the second detecting means is detecting an aural signal being transmitted from the calling station, and locking the transmitter in the calling station while energizing the receiver in the calling station upon lapse of a predetermined period of time corresponding to the period of time division. The transmitter in the calling station is locked and the receiver in the calling station energized to receive an aural signal transmitted from the called station whenever the first detecting means is detecting such signal, and the transmitter in the calling station is automatically released from the locked state upon cessation of reception of the signal from the called station due to the lapse of the allotted period of time, corresponding to the period of time division so that synchronized alternate signal transmission and reception can be attained.

11 Claims, 2 Drawing Figures

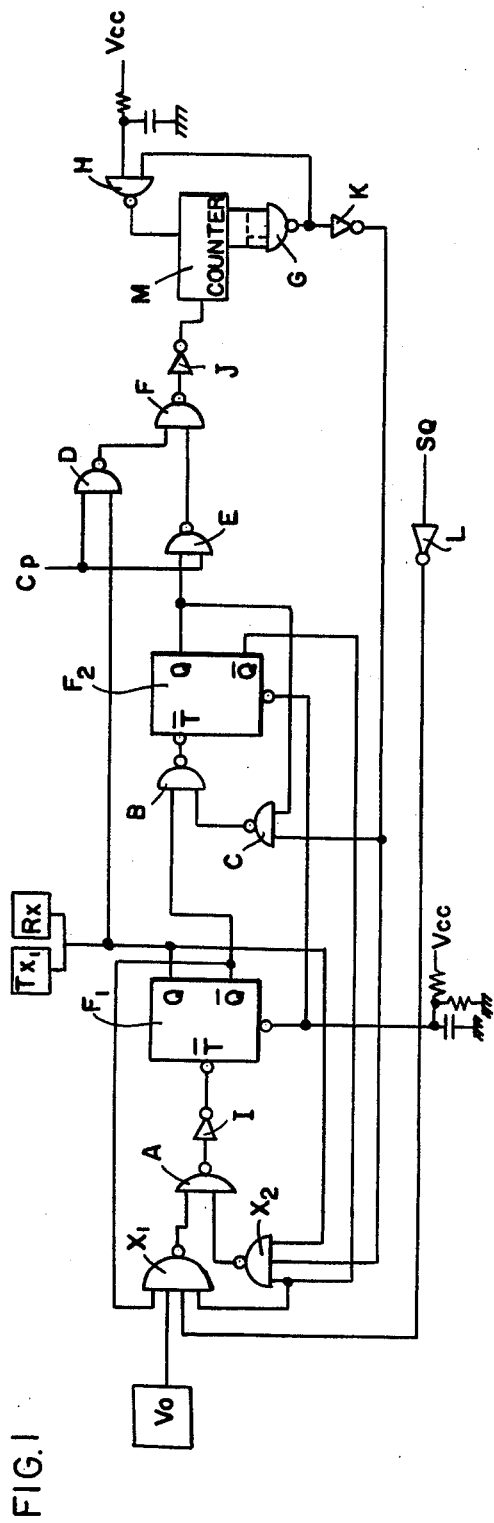
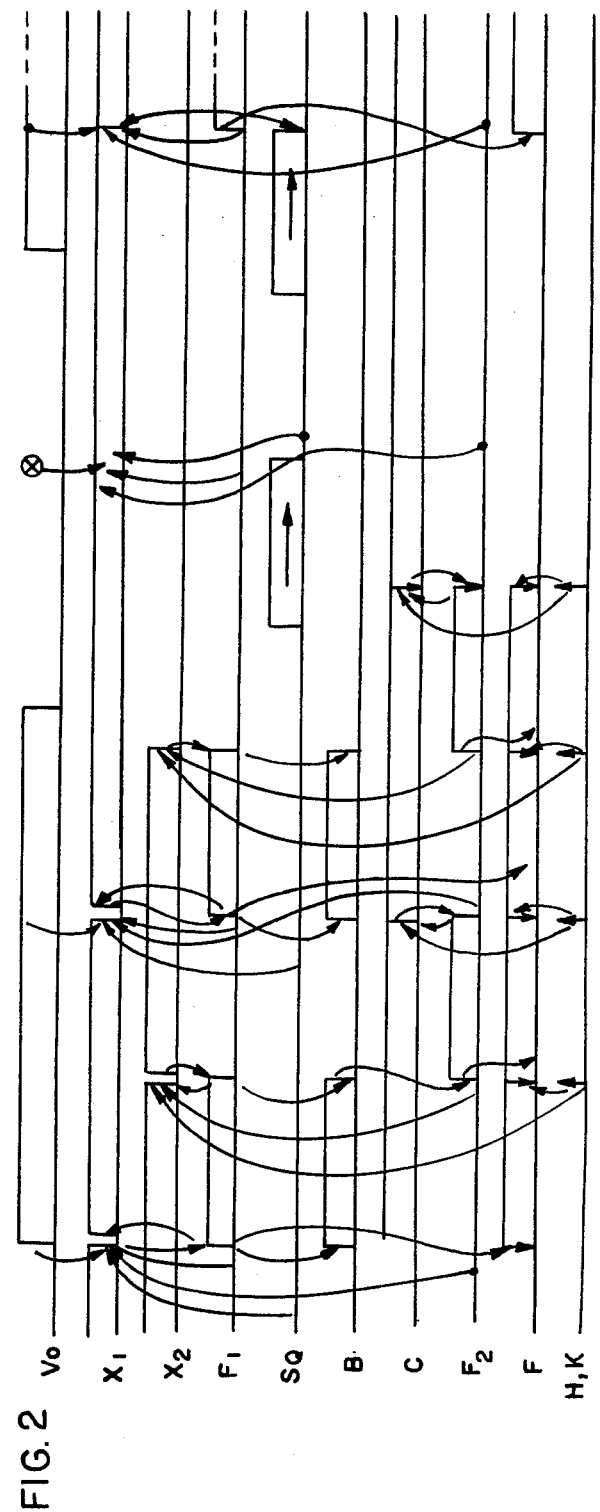
FIG.1
FIG.2

SYNCHRONIZING SYSTEM FOR USE IN TELECOMMUNICATION

BACKGROUND OF THE INVENTION

This invention relates to a synchronizing circuit, and more particularly to a useful synchronizing circuit suitable for application to time division and simultaneous telecommunication system.

A simultaneous telecommunication system capable of simultaneous transmission and reception of aural information between a calling station and a called station has been set forth in the copending application Ser. No. 646,475 filed by Kotzawa et al. on Jan. 5, 1976 and Ser. No. 653,249 filed by Kotezawa et al. on Jan. 28, 1976. In such a simultaneous telecommunication system, it is necessary to attain complete synchronization of signal transmission and reception between a calling station and a called station. An improved synchronizing circuit capable of meeting such requirement is set forth hereat.

In a typical synchronizing system conventionally employed in the art, a synchronizing signal is transmitted together with an information signal from a transmitting station, and in a receiving station, the received synchronizing and information signals are separated by means such as a filter. The synchronizing signal thus separated is used as an input to the electrical circuit of the receiving station. However such conventional synchronizing system has been defective in that a high-quality, high-precision filter must be provided to precisely separate the synchronizing signal from the information signal. Further, the circuitry of the system becomes quite complex due to the necessity for transmission, reception and separation of the information signal and synchronizing signal.

BRIEF SUMMARY OF THE INVENTION

It is an object of the present invention to provide a novel and useful synchronizing circuit suitable for use in a simultaneous telecommunication system in which the principle of time division is utilized for simultaneous transmission and reception of aural information between a calling station and a called station.

Another object of the present invention is to provide a compact synchronizing circuit of the kind above described which can be simply constructed by TTL's or IC's.

In accordance with the present invention, there is provided a synchronizing circuit for use in time division simultaneous telecommunication between a calling station and a called station, said synchronizing circuit being provided in each of said calling and called stations and comprising first detecting means for detecting transmission of an aural signal from said called station, second detecting means for detecting transmission of an aural signal from said calling station, first circuit means for energizing the transmitter in said calling station while locking the receiver in said calling station when said first detecting means is not detecting an aural signal transmitted from said called station and said second detecting means is detecting an aural signal being transmitted from said calling station, and locking the transmitter in said calling station while energizing the receiver in said calling station when said first detecting means is detecting an aural signal transmitted from said called station, and second circuit means for inverting the output of said first circuit means upon lapse of a predetermined period of time after previous inversion of the output of said first circuit means, whereby synchronization can be attained in the repeated alternate transmission and reception of the aural signals between said calling and called stations in time division fashion at a rate corresponding to said predetermined period of time.

It will be seen that the synchronizing circuit according to the present invention is provided in each of the calling and called stations, and comprises means for detecting transmission of an aural signal from the called station and means for detecting transmission of an aural signal from the calling station so as to attain synchronization of signal transmission and reception by alternately controlling the transmitters and receivers in the calling and called stations. According to the present invention, the carrier is used as a synchronizing signal. Therefore, means such as an expensive filter employed in the conventional synchronizing system for the separation of the synchronizing signal and information signal is utterly unnecessary, and yet the desired purpose can be fully achieved with simple circuitry of low cost. The synchronizing circuit of the present invention is quite compact in structure especially when the circuits are formed by TTL's or IC's. Further, the signal used for controlling the transmitter and receiver is periodically inverted upon lapse of the predetermined period of time corresponding to the rate of time division. Thus, this signal provides the synchronizing signal required for the time division simultaneous telecommunication.

BRIEF DESCRIPTION OF THE DRAWINGS

FIG. 1 is a circuit diagram of an embodiment of the synchronizing circuit according to the present invention.

FIG. 2 is a time chart showing waveforms appearing at various parts of the system shown in FIG. 1 to illustrate the operation of the circuit.

DETAILED DESCRIPTION OF THE INVENTION

A preferred embodiment of the synchronizing circuit according to the present invention will now be described in detail with reference to the drawings. The synchronizing circuit shown in FIG. 1 is the one disposed in a calling station, and it is apparent that the same circuit is also disposed in a called station.

Referring to FIG. 1, a first gate comprising a four-input NAND gate $X_1$ is connected at the input terminals thereof to the $\bar{Q}$ output terminal of the first switching means or flip-flop $F_1$, $\bar{Q}$ output terminal of a second switching means or flip-flop $F_2$, output terminal of a voice switch $V_O$, and output terminal of an inverter L, respectively. The inverter L is provided to invert the output of a squelch circuit SQ. One input terminal of a two-input NAND gate A is connected to the output terminal of the NAND gate $X_1$. The initial ouput of the NAND gate $X_1$ is of high level in the initial state of the circuit. (The term "initial output" is used hereinafter to designate the output of a circuit element appearing substantially simultaneously with the turn-on of a power source Vcc, and the term "initial state of circuit" is used hereinafter to designate the state in which no aural signals are transmitted from both the calling and called stations.) In the response to the turn-on of the power source Vcc, the flip-flops $F_1$ and $F_2$ are reset to a first state with the result that their Q output terminals are held in a low level and their $\bar{Q}$ output terminals are held in a high level.

The voice switch $V_O$ is actuated by an aural signal input applied through a microphone or any other suitable element in the calling station, and an output of high level appears at the output terminal thereof. The initial output of this voice switch $V_O$ is of low level in the initial state of the circuit system. The squelch circuit SQ operates when an aural signal transmitted from the called station is being received by a receiver $R_x$ in the calling station, and an output of high level appears at the output terminal thereof. The initial output of this squelch circuit SQ is of low level in the initial state of the circuit.

Means for detecting the transmission of the signal from the called station is in no way limited to the squelch circuit SQ. For example, a special tone signal may be mixed in the aural signal, or the operating voltage of the AGC circuit may be detected, or a special line may be provided to attain the desired detection of reception of the aural signal. However, the squelch circuit SQ is advantageous over the latter means in that it can operate with a satisfactory switching characteristic.

A second gate comprises a three-input NAND gate $X_2$ which is connected at the input terminals thereof to the Q output terminal of the first flip-flop $F_1$, $\overline{Q}$ output terminal of the second flip-flop $F_2$, and output terminal of another inverter K, respectively. The other input terminal of the NAND gate A is connected to the output terminal of the NAND gate $X_2$. The initial output of the NAND gate $X_2$ is of high level in the initial state of the circuit. The $\overline{T}$ input terminal of the first flip-flop $F_1$ is connected to the output terminal of another inverter I which inverts the output of the NAND gate A. The flip-flop $F_1$ is operated to its second state and the output phase of the flip-flop $F_1$ is inverted in response to the arrival of the falling edge of the pulse applied from the inverter I. The Q output terminal of the first flip-flop $F_1$ is connected to one of the input terminals of the NAND gate $X_2$ as described hereinbefore, and this output terminal is also connected to the transmitter $T_x$, to the receiver $R_x$ through an inverter (not shown) and to one input terminal of another NAND gate D. The transmitter $T_x$ and receiver $R_x$ are alternately turned on and off by the Q output of the first flip-flop $F_1$ applied through the respective terminals of the transmitter $T_x$ and receiver $R_x$ as the first flip-flop $F_1$ is operated between the first and second state. Such a switching operation can be easily realized by directly applying the input to the transmitter $T_x$ and inverting the input to the receiver $R_x$ by the inverter in the manner above described. The $\overline{Q}$ output terminal of the first flip-flop $F_1$ is connected to one of the input terminals of the NAND gate $X_1$ as described hereinbefore and also to one input terminal of another NAND gate B.

A two-input NAND gate C is connected at the input terminals thereof to the Q output terminal of the second flip-flop $F_2$ and output terminal of the inverter K, and the output terminal of this NAND gate C is connected to the other input terminal of the NAND gate B. The initial output of this NAND gate C is of high level in the initial state of the circuit. The second flip-flop $F_2$ is connected at the $\overline{T}$ input terminal thereof to the output terminal of the NAND gate B so that the second flip-flop $F_2$ is operated to its second state and the output phase thereof is inverted in response to the arrival of the falling edge of the pulse applied from the NAND gate B. The Q output terminal of the second flip-flop $F_2$ is connected to one of the input terminals of the NAND gate C as described hereinbefore and to one input terminal of another NAND gate E.

A clock pulse generator CP is connected at the output terminal thereof to the other input terminal of the NAND gate D and to the other input terminal of the NAND gate E. A two-input NAND gate F is connected at the input terminal thereof to the output terminals of these NAND gates D and E, and another inverter J is connected to the output terminal of the NAND gate F to invert the output of this NAND gate F. Thus, the clock pulses generated by the clock pulse generator CP are applied to the counter M through the control NAND gates D, E, F and inverter J. The inverter J is provided since the counter M is adapted to count the clock pulses in response to the arrival of the falling edge of each clock pulse.

The counter M is reset in response to the turn-on of the power source Vcc. Further, the counter M is reset each time it counts a predetermined number of clock pulses, and when so reset, it acts to invert one of the inputs to each of the NAND gates $X_2$ and C through another NAND gate G and inverter K. More precisely, when the counter M has counted a predetermined number of clock pulses, an output of high level appears from each bit position of the counter M, and the output phase of the NAND gate G is inverted from a high to a low level since this NAND gate G has input terminals connected to the respective bit positions of the counter M. A two-input NAND gate H is connected at one input terminal thereof to the power source Vcc and at the other input terminal thereof to the output terminal of the NAND gate G. The rate of time division is determined by the period of the clock pulses counted by the counter M and by the predetermined number of the clock pulses.

Therefore, the counter M is in no way limited to the one illustrated by way of example, and may be any suitable one which can send out a specific signal and reset itself when it has counted a predetermined number of clock pulses. For example, the desired purpose can be easily attained by employing a count-down counter in which the number of clock pulses to be counted can be preset.

The operation of the embodiment of the present invention having such an arrangement will be described in detail with reference to a time chart shown in FIG. 2. Description given hereinafter is directed solely to the operation of the elements in the calling station.

In the state in which no aural signal from the called station is being received by the receiver $R_x$ in the calling station after the turn-on of the power source Vcc, the $\overline{Q}$ output terminals of the first and second flip-flops $F_1$ and $F_2$ are held in a high level, and the output terminal of the squelch circuit SQ connected to the inverter L is held in a low level. Thus, the output terminals of the first and second NAND gates $X_1$ and $X_2$ in the gate means for the first switching means are held in a high level.

When an aural signal to be transmitted from the calling station is applied to the voice switch Vo through the microphone in such a state, the voice switch Vo is actuated and an output of high level appears at the output terminal thereof. As a result, high levels appear at all the input terminals of the NAND gate $X_1$, and the output thereof changes to a low level from the high level. The output of the inverter I changes also to a low level to invert the output phase of the first flip-flop $F_1$. That is, a high level and a low level appear at the Q output terminal and $\overline{Q}$ output terminal respectively of the first flip-flop $F_1$. Due to the appearance of the output of high level at the Q output terminal of the first flip-flop $F_1$, the transmitter $T_x$ and receiver $R_x$ in the calling station are energized and locked respectively. When the transmitter $T_x$ in the calling station is thus energized to transmit the aural signal, an output of high level appears at the output terminal of the squelch circuit SQ in the called station. Further, the output of the NAND gate B changes to a high level and is held in this level.

Due to the inversion of the output phase of the first flip $F_1$, the outputs of the NAND gate $X_1$ and inverter I change to the high level again and are held in this level. As a result, an input of high level is applied to the input terminal of the NAND gate D connected to the Q output terminal of the first flip-flop $F_1$. Therefore, the clock pulses generated by the clock pulse generator CP are applied to the counter M through the NAND gate F and inverter J to be counted by the counter M. At this time, the Q output terminal of the second flip-flop $F_2$ is held in the low level, and therefore, the output terminal of the NAND gate E is held in a high level during this counting operation.

After the counter M has counted the clock pulses of predetermined number, high levels appear at all the input terminals of the NAND gate G, and the output thereof changes to a low level. This output is inverted by the inverter K, and a high level appears at the input terminal of the NAND gate $X_2$ connected to the inverter K. Consequently, high levels appear at all the input terminals of the NAND gate $X_2$, and the output thereof changes to a low level. The output of the NAND gate A changes to a high level, and the output of the inverter I changes from the high level to a low level to invert the output phase of the first flip-flop $F_1$. Therefore, an output of low level appears at the Q output terminal of the first flip-flop $F_1$ to lock the transmitter $T_x$ in the calling station although the output terminal of the voice switch $V_o$ is held in the high level. At the same time, the receiver $R_x$ in the calling station is energized and held in the state capable of receiving an aural signal transmitted from the called station. Further, the change in the output level of the NAND gate G results in a change in the output level of the NAND gate H, and the counter M is reset. As a result, the output of the NAND gate G changes to the high level again, and the output of the NAND gate $X_2$ changes to the high level again. Therefore, the output of the inverter I changes to the high level and is held in this level.

An output of high level now appears at the Q output terminal of the first flip-flop $F_1$, and the output of the NAND gate B changes from the high level to a low level to invert the output phase of the second flip-flop $F_2$. Thus, an output of high level and an output of low level appear at the Q output terminal and $\overline{Q}$ output terminal respectively of the second flip-flop $F_2$. The output of high level is applied to one of the input terminals of the NAND gate E, and the clock pulses generated by the clock pulse generator CP are applied to the counter M through the NAND gate F and inverter J to be continuously counted by the counter M in a manner as described hereinbefore. At this time, the Q output terminal of the first flip-flop $F_1$ is held in the low level, and therefore, the output of the NAND gate D is held in a high level during this counting operation.

After the clock pulses of predetermined number have been counted by the counter M in this manner, the output of the NAND gate G changes to the low level again, and this output is inverted by the inverter K. An input of high level is applied to the input terminal of the NAND gate C connected to the inverter K. Thus, high levels appear at all the input terminals of the NAND gate C since a high level has appeared already at the other input terminal of the NAND gate C as a result of the inversion of the Q output of the second flip-flop $F_2$. The output of the NAND gate C changes to a low level, and the output of the NAND gate B changes to a high level. The counter M is reset by the output of the NAND gate G, and the output of the NAND gate G changes to the high level again. Consequently, the output of the NAND gate C changes to the high level again, and the output of the NAND gate B changes to the low level again to invert the output phase of the second flip-flop $F_2$. The circuit is restored to the initial state again, and operation similar to that above described is repeated so long as the outputs of the voice switch $V_o$ and squelch circuit SQ are held in the high level and low level respectively. In this manner, synchronized time division simultaneous telecommunication can be continuously made between the calling and called stations.

When the output terminal of the squelch circuit SQ is held in a high level, that is, when an aural signal transmitted from the called station is being received by the calling station, no inversion in the output phase occurs in the first flip-flop $F_1$ due to the fact that no change occurs in the output level of the NAND gate $X_1$ even when the output of the voice switch $V_o$ is of high level. However, the output of the squelch circuit SQ in the calling station is automaticcally changed to a low level upon lapse of the predetermined period of time above described since the synchronizing circuit in the called station operates in entirely the same manner as that described hereinbefore. Thus, when one of the calling and called stations transmits an aural signal before the other station does during the signal transmission and reception between these stations the squelch circuit SQ in the other station operates to hold a low level at one of the input terminals of the NAND gate $X_1$ so that no change in the output phase may occur in the first flip-flop $F_1$ in that station even when a high level may appear at the output terminal of the voice switch $V_0$ in that station.

We claim:

1. In a synchronizing circuit for use in a time division telecommunication system having a calling station and a called station, said synchronizing circuit being provided in each of said calling and called stations and comprising first detecting means for detecting transmissions of an electrical signal representative of an aural signal from said called station, second detecting means for detecting transmission of an electrical signal representative of an aural signal from said calling station, first circuit means normally providing an output for locking the transmitter in said calling station while energizing the receiver in said calling station, said second detecting means inverting the output of said first circuit means for energizing the transmitter in said calling station while locking the receiver in said calling station when said first detecting means is not detecting a signal transmitted from said called station and said second detecting means is detecting a signal being transmitted from said calling station, and said first detecting means preventing inversion of the output of said first circuit means thereby locking the transmitter in said calling station while energizing the receiver in said calling station when said first detecting means is detecting a signal transmitted from said called station, and second circuit means including timer means for inverting the output of said first circuit means upon lapse of a predetermined period of time after previous inversion of the output of said first circuit means, whereby synchronization can be attained in the repeated alternate transmission and reception of the signals between said calling and called stations in time division fashion at a rate corresponding to said predetermined period of time.

2. A synchronizing system as claimed in claim 1, wherein said first detecting means is a squelch circuit, and said second detecting means is a voice switch.

3. In a synchronizing circuit for use in a time division telecommunication system having a calling station and a called station, said synchronizing circuit being provided in each of said calling and called stations, and comprising first detecting means for detecting transmissions of an electrical signal representative of an aural signal from said called station, second detecting means for detecting transmission of an electrical signal representative of an aural signal from said calling station, first circuit means for energizing the transmitter in said calling station while locking the receiver in said calling station when said second detecting means is detecting a signal transmitted from said calling station and in the absence of a signal transmitted from said called station, and for locking the transmitter in said calling station while energizing the receiver in said calling station when said first detecting means is detecting a signal transmitted from said called station, said first circuit means including a flip flop and first gate means, said first and second detecting means being connected through said first gate means to said flip flop to enable the output phase of said flip flop to be inverted from an initial state when said first detecting means provides an output indicative of the absence of a signal transmitted from said called station and said second detecting means provides an output indicative of the transmission of a signal from said calling station, and to prevent the output phase of said flip flop from being inverted when said first detecting means provides an output indicative of the detection of a signal transmitted from said called station, and second circuit means including second gate means and counter means for counting clock pulses applied thereto from a clock pulse generator through said second gate means, said second gate means being controlled by said flip flop to enable said counter means to start to count the clock pulses in response to the inversion of the output phase of said said flip flop, said counter means being operable to invert the output phase of said flip flop to the initial state when the count thereof attains a predetermined value, and said counter means resetting itself at the same time to prepare for a subsequent counting operation, whereby said second circuit means periodically inverts the output of said flip flop upon lapse of a predetermined period of time after previous inversion of the output of said flip flop to thereby provide synchronization in the repeated alternate transmission and reception of the signals between said calling and called stations in time division fashion at a rate corresponding to said predetermined period of time.

4. A synchronizing system as claimed in claim 3, wherein said first and second circuit means are each formed by an integrated circuit.

5. In a synchronizing circuit for use in a time division telecommunication system having a calling station and a called station, each station having a transmitter means and receiver means, said synchronizing circuit comprising first detecting means for providing a first signal indicating the receipt of electrical signals representing aural signals from said called station, second detecting means for providing a second signal indicating the transmission of electrical signals representing aural signals by said calling station, first switching means normally maintained in a first state to lock said transmitter means and energize said receiver means, said first switching means being operable to a second state to energize said transmitter means and simultaneously lock said receiver means, gate means for operating said first switching means between its first and second states, said gate means including a first gate having at least one input connected to said first detecting means, a second input connected to said second detecting means, a third input connected to said first switching means, and a fourth input, and output means connected to a control input of said first switching means, said first gate being enabled by said second signal and in the absence of said first signal for operating said first switching means from its first state to its second state, timer means for measuring a first predetermined time interval, control means for enabling said timer means in response to operation of said first switching means to said second state, said gate means including a second gate having an input connected to said timer means and being enabled with the termination of said first predetermined time interval to switch said first switching means from its second state to said first state, second switching means, and further gate means for operating said second switching means from a first state to a second state in response to operation of said first switching means from its second state to its first state, said second switching means having an output connected to said control means for enabling said control means to be responsive to said change of state of said second switching means from said first state to said second state to enable said timer means in the generation of a further one of said predetermined time intervals, said second switching means having a further output connected to a fourth input of said first gate for inhibiting said first gate during said further time interval to maintain said first switching means in its first state during said further time interval.

6. A system as set forth in claim 5 in which said timer means includes a counter having a start circuit connected to said control means, and an output circuit connected to said second gate means and said further gate means for providing a signal thereat in response to advance of the counter to a predetermined count, and means operable to reset said counter means responsive to operation of said counter means to said predetermined count.

7. A synchronizing circuit as set forth in claim 5 in which said first detecting means is operative for the period of detection of signals transmitted by said called station to provide a signal over said first input to said first gate means to maintain said first switching means in said first state during the period signals are transmitted by said called station independent of the input signals over said second input by said second detecting means during said period.

8. A synchronizing circuit as set forth in claim 5 in which said second gate maintains said first switching means in said second state until the predetermined timing interval is completely independent of the detection by said first detecting means of signals being transmitted by said called station.

9. A synchronizing circuit as set forth in claim 5 in which said further gate means in operative in response to completion of the operation of said further predetermined time interval to operate said second switching means from said second state to said first state.

10. A synchronizing circuit as set forth in claim 9 in which said second switching means is operative in the absence of signals from said called station after said further interval to control said first gate over said fourth input to operate said first switching means to said second state.

11. In a synchronizing circuit for use in a time division telecommunication system having a calling station and a called station, each station having a transmitter means and receiver means, said synchronizing circuit comprising first detecting means for providing a first control signal indicating the receipt of an electrical signal representing an aural signal from said called station, second detecting means for providing a second control signal indicating the transmission of an electrical signal representing an aural signal by said calling station, bistable means for controlling the operation of said transmitter means and said receiver means, said bistable means being normally maintained in a first state for disabling said transmitter means and enabling said receiver means, enabling means responsive to said second control signal and in the absence of said first control signal to operate said bistable means to a second state for enabling said transmitter means and simultaneously disabling said receiver means, timer means responsive to said bistable means being operated to said second state for controlling said enabling means to cause said bistable means to be operated from said second state to said first state at the end of a first predetermined period of time for disabling said transmitter means and enabling said receiver means, and inhibit means responsive to said bistable means and said timer means for inhibiting said enabling means to prevent said bistable means from being operated to said second state for a second predetermined period of time after the end of said first period of time, thereby maintaining said transmitter means disabled and said receiver means enabled during said second period of time.

* * * * *

UNITED STATES PATENT AND TRADEMARK OFFICE
CERTIFICATE OF CORRECTION

PATENT NO. : 4,086,429

DATED : April 25, 1978

INVENTOR(S) : Katsutaka Kotezawa et al.

It is certified that error appears in the above-identified patent and that said Letters Patent are hereby corrected as shown below:

Col. 1, line 14, "Kotzawa" should be "Kotezawa"

Col. 5, line 49, "Q" should be "$\overline{Q}$"

Col. 7, line 49, after "of" -- omit "said"

Signed and Sealed this

Fifth Day of September 1978

[SEAL]

Attest:

RUTH C. MASON
*Attesting Officer*

DONALD W. BANNER
*Commissioner of Patents and Trademarks*